(12) United States Patent
Suzuki

(10) Patent No.: US 9,515,743 B2
(45) Date of Patent: Dec. 6, 2016

(54) RECEIVER, TRANSMISSION SYSTEM, METHOD FOR RECEIVING POLARIZATION MULTIPLEXED OPTICAL SIGNAL, AND NON-TRANSITORY COMPUTER READABLE MEDIUM STORING RECEIVER CONTROL PROGRAM

(71) Applicant: Kouichi Suzuki, Tokyo (JP)

(72) Inventor: Kouichi Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 100 days.

(21) Appl. No.: 14/382,494

(22) PCT Filed: Mar. 1, 2013

(86) PCT No.: PCT/JP2013/001279
§ 371 (c)(1),
(2) Date: Sep. 2, 2014

(87) PCT Pub. No.: WO2013/012894
PCT Pub. Date: Sep. 6, 2013

(65) Prior Publication Data
US 2015/0110490 A1 Apr. 23, 2015

(30) Foreign Application Priority Data
Mar. 2, 2012 (JP) .................. 2012-046560

(51) Int. Cl.
*H04B 10/61* (2013.01)
*H04J 14/06* (2006.01)
*H04L 27/22* (2006.01)

(52) U.S. Cl.
CPC ........... *H04B 10/614* (2013.01); *H04B 10/611* (2013.01); *H04B 10/6166* (2013.01); *H04J 14/06* (2013.01); *H04L 27/22* (2013.01)

(58) Field of Classification Search
CPC .................................................. H04B 10/611
See application file for complete search history.

(56) References Cited

U.S. PATENT DOCUMENTS

2007/0147850 A1 6/2007 Savory et al.
2009/0214201 A1 8/2009 Oda et al.
(Continued)

FOREIGN PATENT DOCUMENTS

CN 102215189 A 10/2011
CN 102326343 A 1/2012
(Continued)

OTHER PUBLICATIONS

J. Treichler et al., "New Processing Techniques Based on the Constant Modulus Adaptive Algorithm", IEEE Transactions on Acoustics, Speech, and Signal Processing, vol. ASSP-33, No. 2, XP-000760777, pp. 420-431, Apr. 1985.
Extended European Search Report mailed on Oct. 28, 2015 by the European Patent Office in counterpart European Patent Application No. 13754123.1.
(Continued)

*Primary Examiner* — Nathan Curs
(74) *Attorney, Agent, or Firm* — Finnegan, Henderson, Farabow, Garrett & Dunner LLP

(57) ABSTRACT

In a receiver, a reception front end receives a polarization-scrambled polarization multiplexed optical signal, polarization-separates the received polarization multiplexed optical signal, and converts each signal into quantized signals. A digital signal processor samples the quantized signals, demodulates the signals by using a polarization separation digital signal processing algorithm, and outputs demodulated signals. When phase and amplitude variations of the demodulated signals are greater than a predetermined value, a control circuit causes the digital signal processor to interrupt processing using the polarization separation digital signal processing algorithm, changes an initial value of a filter coefficient, and then causes the digital signal processor to start the processing using the polarization separation digital signal processing algorithm.

27 Claims, 10 Drawing Sheets

(56) References Cited

U.S. PATENT DOCUMENTS

| | | | |
|---|---|---|---|
| 2010/0028011 A1* | 2/2010 | Kaneda | H04B 10/61 398/115 |
| 2011/0150477 A1 | 6/2011 | Winzer | |
| 2012/0002979 A1* | 1/2012 | Xie | H04B 10/611 398/208 |
| 2012/0045208 A1* | 2/2012 | Yasuda | H04B 10/60 398/65 |
| 2012/0148266 A1* | 6/2012 | Komaki | H04B 10/611 398/210 |

FOREIGN PATENT DOCUMENTS

| | | |
|---|---|---|
| EP | 2 273 701 A1 | 1/2011 |
| JP | 2009-198364 | 9/2009 |
| JP | 2010-109705 | 5/2010 |
| JP | 2011-97253 | 5/2011 |
| JP | 2011-223185 | 11/2011 |
| WO | WO 2011/083748 A1 | 7/2011 |

OTHER PUBLICATIONS

Chinese Office Action issued by the Chinese Patent Office in counterpart Chinese Patent Application No. 201380012079.3, dated Dec. 1, 2015.

D. Godard, "Self-Recovering Equalization and Carrier Tracking in Two-Dimensional Data Communication Systems", IEEE Transactions on Communications, vol. Com-28, No. 11, pp. 1867-1875, Nov. 1980.

A. Leven et al., "A real-time CMA-based 10 Gb/s polarization demultiplexing coherent receiver implemented in an FPGA", OFC/INFOEC, IEEE, 2008.

L. Liu et al., "Initial Tap Setup of Constant Modulus Algorithm for Polarization De-multiplexing in Optical Coherent Receivers", OSA/OFC/INFOEC, IEEE, 2009.

H. Zhu et al., "An improvement on constant modulus algorithm for polarization demultiplexing in optical coherent receivers", Optics Communications, vol. 283, issue 22, pp. 4541-4545, Nov. 2010.

International Search Report mailed Mar. 26, 2013.

\* cited by examiner

Fig. 7
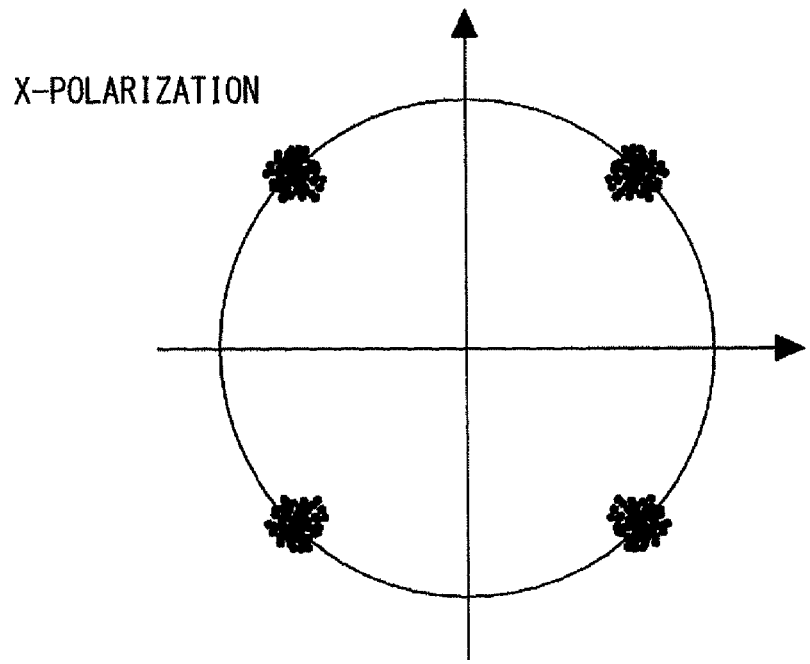
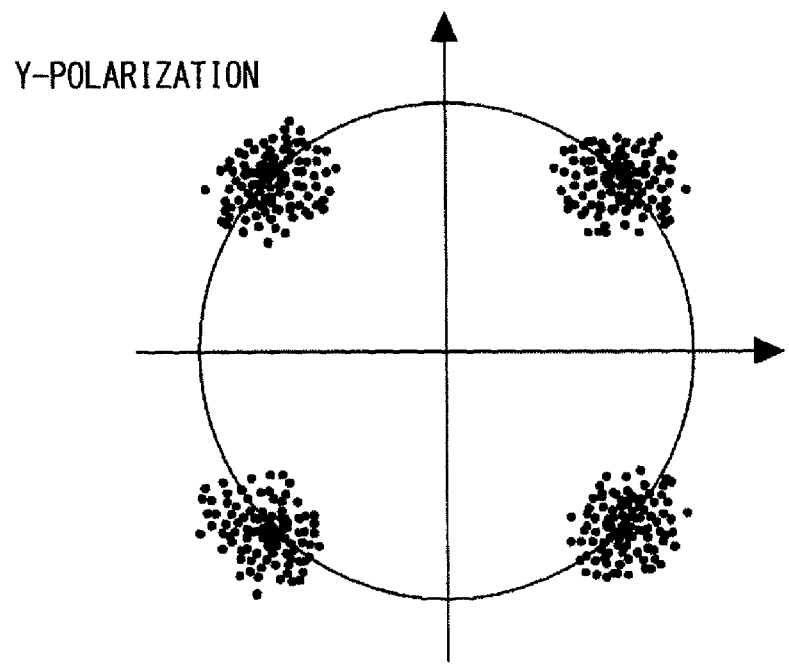

Fig. 8
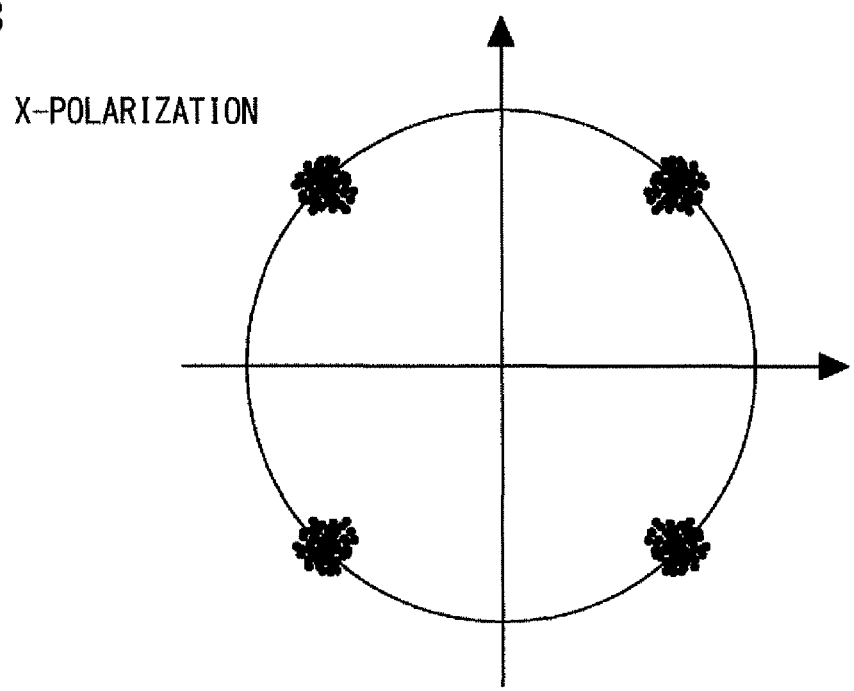
X-POLARIZATION
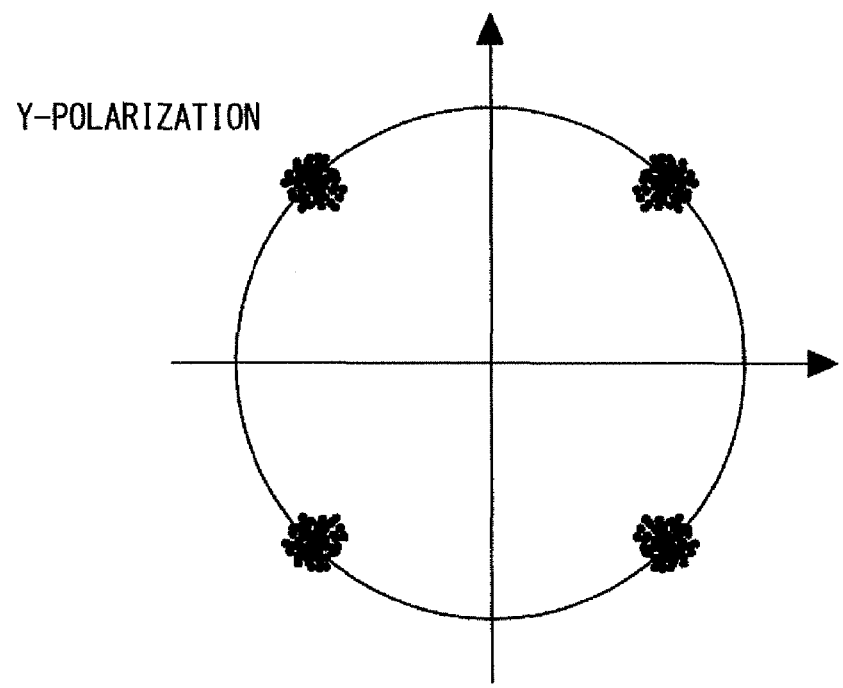
Y-POLARIZATION

RECEIVER, TRANSMISSION SYSTEM, METHOD FOR RECEIVING POLARIZATION MULTIPLEXED OPTICAL SIGNAL, AND NON-TRANSITORY COMPUTER READABLE MEDIUM STORING RECEIVER CONTROL PROGRAM

CROSS-REFERENCE TO RELATED PATENT APPLICATIONS

This application is a National Stage Entry of International Application No. PCT/JP2013/001279, filed Mar. 1, 2013, which claims priority from Japanese Patent Application No. 2012-046560, filed Mar. 2, 2012. The entire contents of the above-referenced applications are expressly incorporated herein by reference.

TECHNICAL FIELD

The present invention relates to a receiver, a transmission system, a method for receiving a polarization multiplexed optical signal, and a receiver control program. In particular, the present invention relates to a receiver that performs digital coherent transmission, a transmission system, a method for receiving a polarization multiplexed optical signal, and a non-transitory computer readable medium storing a receiver control program.

BACKGROUND ART

With an increase in the Internet traffic, there is a demand for a further increase in capacity of trunk transmission systems. As a technique for achieving a further increase in capacity of trunk transmission systems, a coherent transmission technique is attracting attention.

In a normal coherent transmission, when the polarization of an LO light source (local oscillator) of a receiver does not match the polarization of an input signal, it is difficult to appropriately receive the signal. For this reason, an optical device, such as a polarization stabilizer, is required to match the polarizations.

On the other hand, in a digital coherent transmission (for example, Patent Literature 1 and 2), a polarization separation function using a digital signal processing algorithm is used. In the digital coherent transmission, a polarization separation digital signal processing algorithm, such as CMA (Constant Modulus Algorithm) (Non Patent Literature 1 to 3), which separates two orthogonal signals (polarizations), is used to thereby make it possible to separate two polarization modes. By using this polarization separation function, the polarization multiplexing transmission in which different signals are transmitted in two orthogonal polarization modes can be achieved.

CITATION LIST

Patent Literature

Patent Literature 1: Japanese Unexamined Patent Application Publication No. 2010-109705
Patent Literature 2: Japanese Unexamined Patent Application Publication No. 2011-97253

Non Patent Literature

Non Patent Literature 1: DOMINIQUE N. GODARD, "Self-Recovering Equalization and Carrier Tracking in Two-Dimensional Data Communication Systems", IEEE TRANSACTIONS ON COMMUNICATIONS, VOL. COM-28, NO. 11, NOV. 1980, pp. 1867-1875.

SUMMARY OF INVENTION

Technical Problem

However, the present inventor has found that the digital coherent transmission has the following problem. That is, when the polarization multiplexed optical signal used for the polarization multiplexing transmission is transmitted through an actual transmission line, reception characteristics vary due to the influence of a polarization dependent loss (PDL) in the transmission line. This is because the reception characteristics are strongly influenced by an initial value to be used at the time of starting the polarization separation digital signal processing algorithm, such as the CMA, which is used for separation of polarization modes. The term "initial value" described herein refers to an initial filter coefficient of a digital filter which is used during execution of polarization separation digital signal processing. The details thereof will be described later.

Especially when the PDL is large, a polarization mode having a large loss is lost, which causes a phenomenon in which the same polarization mode is locked, or a phenomenon in which the reception characteristics of only the polarization on one side deteriorate. This results in deterioration of the reception characteristics of the entire system.

Meanwhile, the reception characteristics can be improved by performing processing using the polarization separation digital signal processing algorithm, such as the CMA, again, while changing the polarization state. However, since the polarization state of the transmission line varies slowly with time, it is difficult to draw the polarization multiplexed optical signal constantly under optimum conditions, even when the processing using the polarization separation digital signal processing algorithm, such as the CMA, is performed again in a typical digital coherent configuration. The introduction of the digital coherent transmission into a real system may be hindered if transmission characteristics cannot be stabilized.

The present invention has been made in view of the above-mentioned circumstances, and an object of the present invention is to provide a receiver, a transmission system, a method for receiving a polarization multiplexed optical signal, and a non-transitory computer readable medium storing a receiver control program, which are capable of stabilizing reception characteristics in a digital coherent transmission.

Solution to Problem

A receiver according to an exemplary aspect of the invention includes: a reception front end that receives a polarization-scrambled polarization multiplexed optical signal, polarization-separates the received polarization multiplexed optical signal into first and second polarization components, and photoelectrically converts the first and second polarization components into first and second digital signals, respectively; a digital signal processor that samples the first and second digital signals, demodulates the first and second digital signals by using a polarization separation digital signal processing algorithm, and outputs first and second demodulated signals; and a control circuit that causes the digital signal processor to interrupt processing using the polarization separation digital signal processing algorithm when phase and amplitude variations of the first and second demodulated signals are greater than a first predetermined value, changes an initial value of a filter coefficient used for the polarization separation digital signal processing algorithm, and then causes the digital signal processor to start the processing using the polarization separation digital signal processing algorithm.

A transmission system according to an exemplary aspect of the present invention includes: a transmitter that outputs a polarization multiplexed optical signal; a polarization scrambler that polarization-scrambles the polarization multiplexed optical signal; a transmission line through which the polarization-scrambled polarization multiplexed optical signal is propagated; and a receiver that receives the polarization-scrambled polarization multiplexed optical signal through the transmission line. The receiver includes: a reception front end that polarization-separates the received polarization multiplexed optical signal into first and second polarization components, and photoelectrically converts the first and second polarization components into first and second digital signals, respectively; a digital signal processor that samples the first and second digital signals, demodulates the first and second digital signals by using a polarization separation digital signal processing algorithm, and outputs first and second demodulated signals; and a control circuit that causes the digital signal processor to interrupt processing using the polarization separation digital signal processing algorithm when phase and amplitude variations of the first and second demodulated signals are greater than a first predetermined value, changes an initial value of a filter coefficient used for the polarization separation digital signal processing algorithm, and then causes the digital signal processor to start the processing using the polarization separation digital signal processing algorithm.

A method for receiving a polarization multiplexed optical signal according to an exemplary aspect of the present invention includes: polarization-separating a polarization-scrambled polarization multiplexed optical signal into first and second polarization components; photoelectrically converting the first and second polarization components into first and second digital signals, respectively; sampling the first and second digital signals and demodulating the first and second digital signals by using a polarization separation digital signal processing algorithm; outputting the demodulated signals as first and second demodulated signals, respectively; causing the digital signal processor to interrupt processing using the polarization separation digital signal processing algorithm when phase and amplitude variations of the first and second demodulated signals are greater than a first predetermined value; and changing an initial value of a filter coefficient used for the polarization separation digital signal processing algorithm and then starting the processing using the polarization separation digital signal processing algorithm.

According to an exemplary aspect of the present invention, there is provided a non-transitory computer readable medium storing a control program for a receiver, the receiver including: a reception front end that receives a polarization-scrambled polarization multiplexed optical signal, polarization-separates the received polarization multiplexed optical signal into first and second polarization components, and photoelectrically converts the first and second polarization components into first and second digital signals, respectively; and a digital signal processor that samples the first and second digital signals, demodulates the first and second digital signals by using a polarization separation digital signal processing algorithm, and outputs first and second demodulated signals, the control program causing a computer to execute processing including: causing the digital signal processor to interrupt processing using the polarization separation digital signal processing algorithm when phase and amplitude variations of the first and second demodulated signals are greater than a first predetermined value; and changing an initial value of a filter coefficient used for the polarization separation digital signal processing algorithm, and then causing the digital signal processor to start the processing using the polarization separation digital signal processing algorithm.

Advantageous Effects of Invention

According to the present invention, it is possible to provide a receiver, a transmission system, a method for receiving a polarization multiplexed optical signal, and a non-transitory computer readable medium storing a receiver control program, which are capable of stabilizing reception characteristics in a digital coherent transmission.

BRIEF DESCRIPTION OF DRAWINGS

FIG. 7 is a signal space diagram showing the case where reception characteristics of X-polarization and Y-polarization are balanced;

FIG. 8 is a signal space diagram showing the case where reception characteristics of X-polarization and Y-polarization are unbalanced;

DESCRIPTION OF EMBODIMENTS

Figure 1:
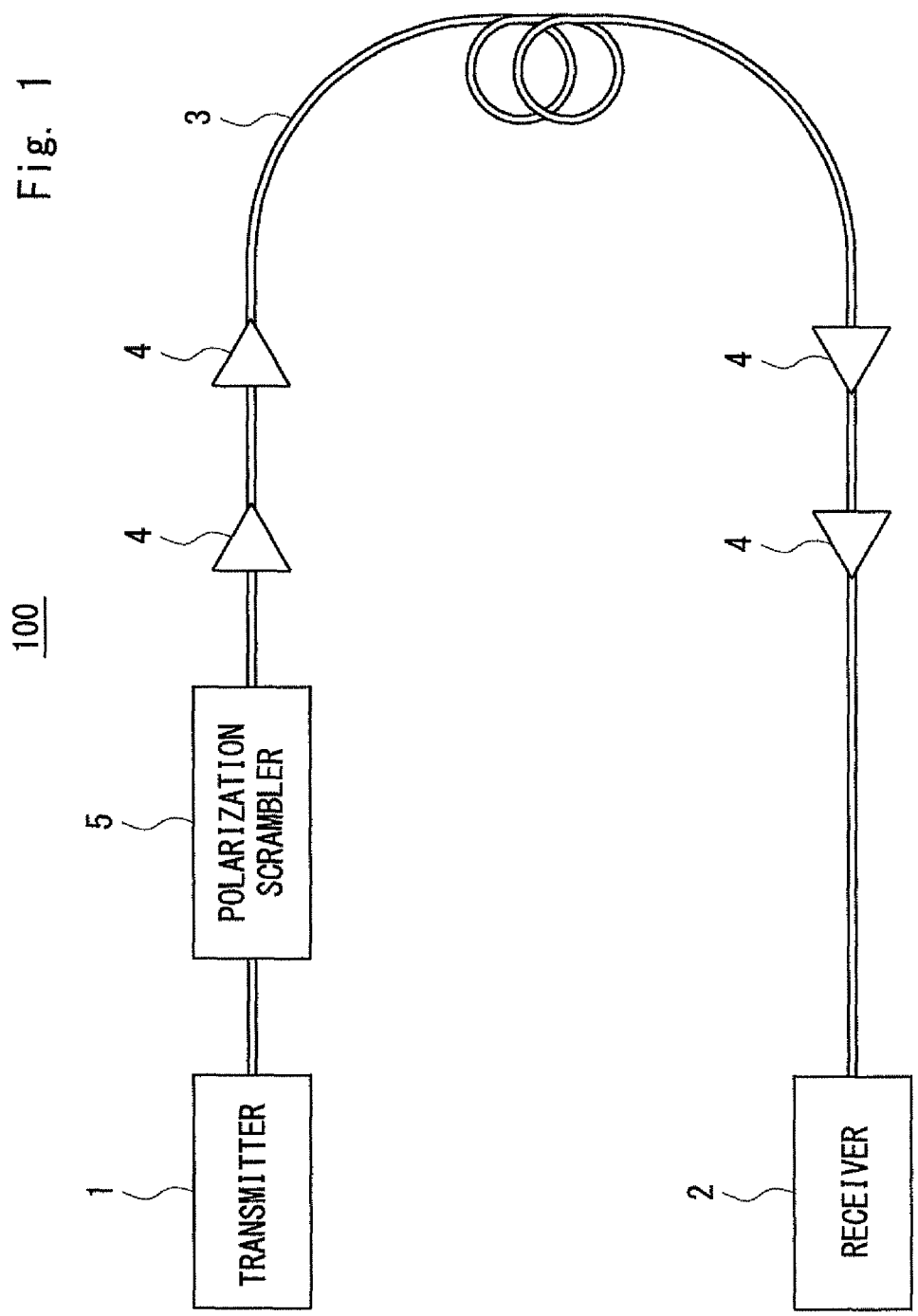
FIG. 1 is a block diagram showing a configuration of a transmission system 100 according to a first exemplary embodiment.

Exemplary embodiments of the present invention will be described below with reference to the drawings. The same components are denoted by the same reference numerals throughout the drawings, and a repeated explanation is omitted as needed.

First Exemplary Embodiment

First, a transmission system 100 according to a first exemplary embodiment of the present invention will be described. FIG. 1 is a block diagram showing the configuration of the transmission system 100 according to the first exemplary embodiment. The transmission system 100 includes a transmitter 1, a receiver 2, a transmission line 3, optical amplifiers 4, and a polarization scrambler 5.

The transmitter 1 outputs, as an optical signal, a DP-QPSK optical signal which has been subjected to dual polarization-quadrature phase shift keying (hereinafter referred to as "DP-QPSK"). In other words, the DP-QPSK optical signal output from the transmitter 1 includes X-polarization and Y-polarization which have polarization planes orthogonal to each other. The X-polarization and the Y-polarization are quadrature phase shift keying (hereinafter referred to as "QPSK") optical signals.

The transmitter 1 and the receiver 2 are optically connected to each other by the transmission line 3, and the DP-QPSK optical signal is propagated through the transmission line 3. The transmission line 3 is provided with the optical amplifiers 4 to amplify the DP-QPSK optical signal propagated through the transmission line 3.

The polarization scrambler 5 is disposed on the output side of the transmitter 1, and performs polarization scrambling of the DP-QPSK optical signal. Specifically, the polarization scrambler 5 rotates the polarization plane of the DP-QPSK optical signal at a constant cycle (polarization scrambling). Assuming that the electric field of the X-polarization of the DP-QPSK optical signal before being input to the polarization scrambler 5 is represented by $E_x$, the electric field of the Y-polarization thereof is represented by $E_y$, and the angular velocity of the rotation of the polarization plane by the polarization scrambler 5 is represented by $\omega$[rad/sec], the electric field $Er_x$ of the X-polarization and the electric field $Er_y$ of the Y-polarization of the DP-QPSK optical signal output from the polarization scrambler 5 are represented by the following Formula (1).

$$\begin{pmatrix} Er_x \\ Er_y \end{pmatrix} = \begin{pmatrix} \cos\omega t & -\sin\omega t \\ \sin\omega t & \cos\omega t \end{pmatrix} \begin{pmatrix} E_x \\ E_y \end{pmatrix} \quad (1)$$

The polarization scrambler 5 rotates the polarization plane at a rate of, for example, about 100[rad/s], so that the receiver 2 can follow the rotation of the polarization plane.

Figure 2:
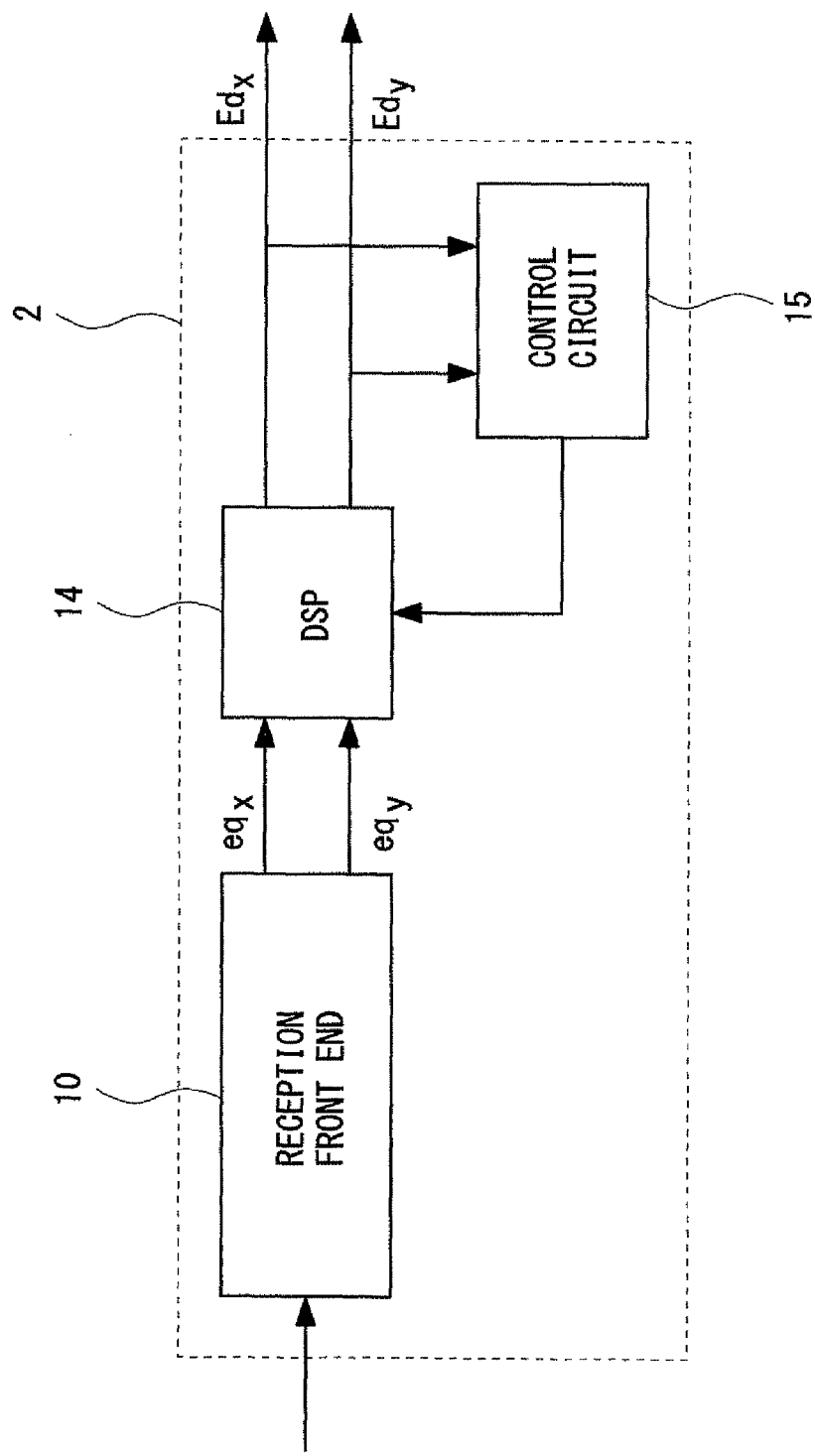
FIG. 2 is a block diagram schematically showing a configuration of a receiver 2 of the transmission system 100.

The receiver 2 is a receiver that performs digital coherent reception to demodulate the DP-QPSK optical signal, which has a polarization plane that rotates at an angular velocity $\omega$, into an electric signal. FIG. 2 is a block diagram schematically showing the configuration of the receiver 2 of the transmission system 100. As shown in FIG. 2, the receiver 2 includes a reception front end 10, a digital signal processor (hereinafter referred to as "DSP") 14, and a control circuit 15.

The reception front end 10 receives the DP-QPSK optical signal through the transmission line 3. Further, the reception front end 10 polarization-separates the received DP-QPSK optical signal, and then photoelectrically converts the signal. Quantized signals $eq_{ix}$ and $eq_{qx}$, which are digital signals generated by photoelectric conversion, are output to the DSP 14.

The reception front end 10 receives the DP-QPSK optical signal through the transmission line 3. Further, the reception front end 10 polarization-separates the received DP-QPSK optical signal, and then photoelectrically converts the signal. Quantized signals $eq_x$ and $eq_x$, which are digital signals generated by photoelectric conversion, are output to the DSP 14.

The DSP 14 samples the quantized signals $eq_x$ and $eq_x$, demodulates the signals by using, for example, a polarization separation digital signal processing algorithm, such as the CMA, and outputs demodulated signals $Ed_x$ and $Ed_y$.

The control circuit 15 monitors the demodulated signals $Ed_x$ and $Ed_y$. When a phase variation (phase noise) or an amplitude variation (amplitude noise) of the demodulated signals $Ed_x$ and $Ed_y$ is greater than a predetermined value, the control circuit 15 causes the DSP 14 to interrupt processing using the polarization separation digital signal processing algorithm. Then the control circuit 15 changes an initial value of a filter coefficient used for the polarization separation digital signal processing algorithm. After that, the control circuit 15 causes the DSP 14 to start the processing using the polarization separation digital signal processing algorithm.

The method in which the control circuit 15 determines whether or not to cause the DSP 14 to interrupt the processing using the polarization separation digital signal processing algorithm is not limited to the example described above. For example, when both the phase variation (phase noise) and the amplitude variation (amplitude noise) are greater than respective predetermined values, the control circuit 15 may cause the DSP 14 to interrupt the processing using the polarization separation digital signal processing algorithm. As the phase variation (phase noise), for example, a phase distribution range or a phase standard deviation on a signal space diagram can be used. As the amplitude variation (amplitude noise), for example, an amplitude distribution range or an amplitude standard deviation on a signal space diagram can be used.

As another example of the phase and amplitude variations, an area in which spots appearing on a signal space diagram and representing the phase and amplitude of signals are distributed can be treated as a scalar quantity, without distinguishing the phase variation and the amplitude variation from each other. In this case, when the area in which the spots appearing on the signal space diagram and representing the phase and amplitude of signals are distributed is larger than a predetermined value, the control circuit 15 may cause the DSP 14 to interrupt the processing using the polarization separation digital signal processing algorithm.

In the above example, the phase variation and the amplitude variation are treated as a scalar quantity, but this is by way of example only. That is, the phase variation and the amplitude variation can also be defined as a vector quantity in consideration of the directions of the variations, such as the positive and negative of values.

Figure 3:
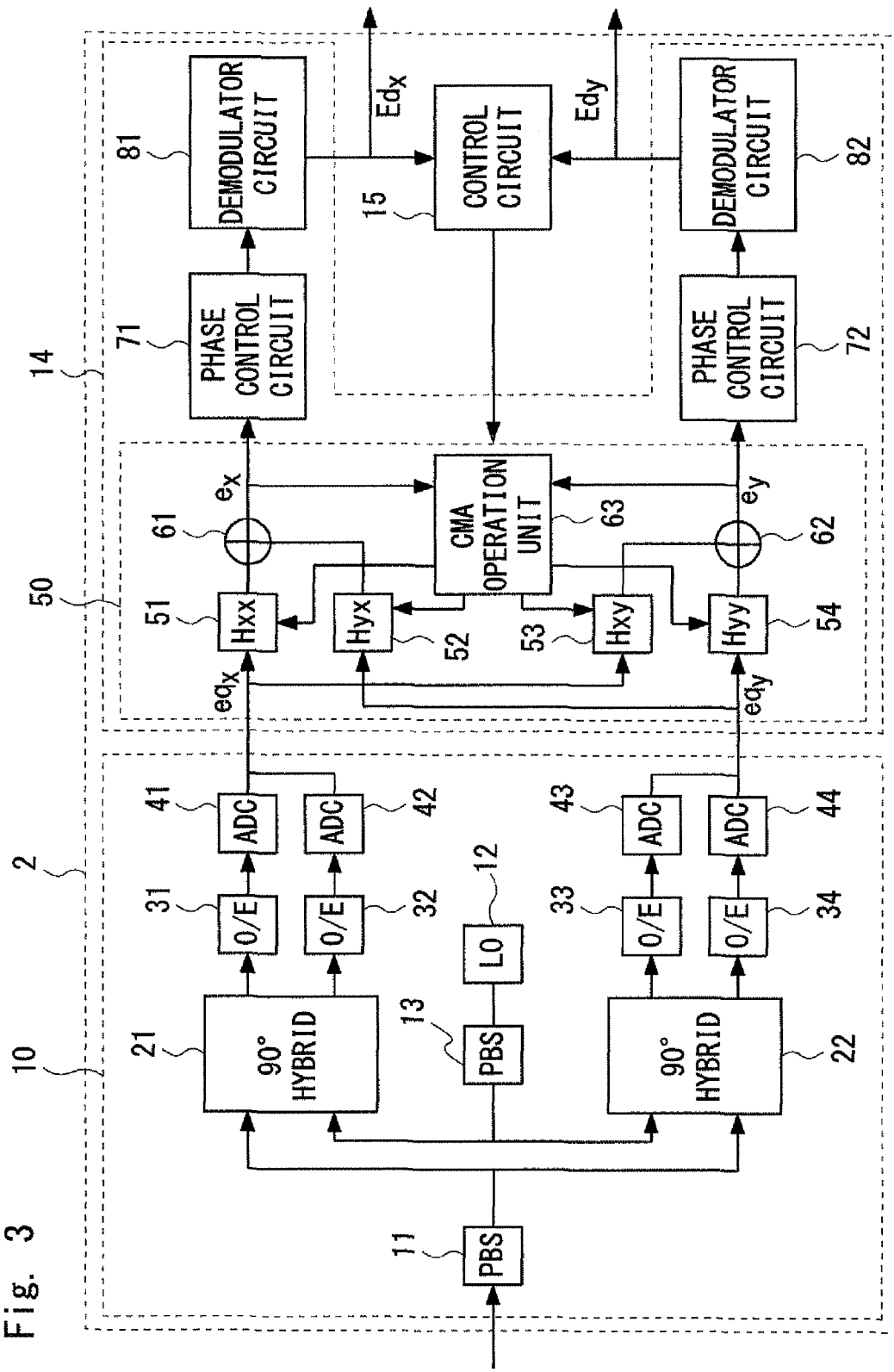
FIG. 3 is a block diagram showing a more detailed configuration of the receiver 2 of the transmission system 100.

Next, the configuration of the receiver 2 will be described in more detail. FIG. 3 is a block diagram showing a more detailed configuration of the receiver 2 of the transmission system 100. As shown in FIG. 3, the reception front end 10 includes a polarization beam splitter (hereinafter referred to as "PBS") 11, a local oscillator light source (LO) 12, a PBS 13, 90° hybrids 21 and 22, optical/electrical converters (O/E) 31 to 34, and analog-to-digital converters (ADC) 41 to 44.

The PBS 11 receives the DP-QPSK optical signal through the transmission line 3. The PBS 11 separates the received DP-QPSK optical signal into two orthogonal polarization components. Specifically, the PBS 11 separates the received DP-QPSK optical signal into an x-polarization component $x_{in}$ and a y-polarization component $y_{in}$ which are orthogonal to each other. The x-polarization component $x_{in}$ is input to the 90° hybrid 21 and the y-polarization component $y_{in}$ is input to the 90° hybrid 22.

The local oscillator light source 12 outputs local oscillation light to the PBS 13. For example, a semiconductor laser can be used as the local oscillator light source 12. It is assumed in this exemplary embodiment that the local oscillator light source 12 outputs CW (Continuous Wave) light having a predetermined frequency. The PBS 13 separates the local oscillation light into two orthogonal polarization components (an x-polarization component $LO_x$ and a y-polarization component $LO_y$). The x-polarization component $LO_x$ of the local oscillation light is input to the 90° hybrid 21, and the y-polarization component $LO_y$ of the local oscillation light is input to the 90° hybrid The 90° hybrid 21 detects the x-polarization component $x_{in}$ by using the x-polarization component $LO_x$ of the local oscillation light, and outputs, as detected light, an I (In-phase) component (hereinafter referred to as an $x_{in}$-I component) and a Q (Quadrature) component (hereinafter referred to as an $x_{in}$-Q component) which has a phase shifted by 90° from the I component. The 90° hybrid 22 detects the y-polarization component $y_{in}$ by using the y-polarization component $LO_y$ of the local oscillation light, and outputs, as detected light, an I component (hereinafter referred to as a $y_{in}$-I component) and a Q component (hereinafter referred to as a $y_{in}$-Q component).

The optical/electrical converters 31 to 34 photoelectrically convert four optical signals (the $x_{in}$-I component, the $x_{in}$-Q component, the $y_{in}$-I component, and the $y_{in}$-Q component), respectively, which are output from the 90° hybrids 21 and 22.

The ADCs 41 to 44 convert the analog electric signals, which are output from the optical/electrical converters 31 to 34, respectively, into digital signals, and output the digital signals, which are obtained by the conversion, to the DSP 14.

The DSP 14 processes the received digital signals. The DSP 14 includes a butterfly filter 50, phase control circuits 71 and 72, and demodulator circuits 81 and 82. The butterfly filter 50 includes finite impulse response (hereinafter referred to as "FIR") filters 51 to 54, adders 61 and 62, and a CMA operation unit 63. The CMA operation unit 63 is an example of a polarization separation digital signal processing algorithm operation unit.

The FIR filters 51 and 53 receive the signal (hereinafter referred to as the quantized signal $eq_x$) output from the ADC 41 and the ADC 42. The FIR filters 52 and 54 receive the signal (hereinafter referred to as the quantized signal $eq_y$) output from the ADC 43 and the ADC 44. The FIR filter 51 performs filtering of the quantized signal $eq_x$, and outputs the filtered signal to the adder 61. The FIR filter 52 performs filtering of the quantized signal $eq_y$, and outputs the filtered signal to the adder 61. The FIR filter 53 performs filtering of the quantized signal $eq_x$, and outputs the filtered signal to the adder 62. The FIR filter 54 performs filtering of the quantized signal $eq_y$, and outputs the filtered signal to the adder 62.

The adder 61 adds the signals output from the FIR filters 51 and 52, and outputs the added signal (hereinafter referred to as an added signal $e_x$) to the phase control circuit 71. The adder 62 adds the signals output from the FIR filters 53 and 54, and outputs the added signal (hereinafter referred to as an added signal $e_y$) to the phase control circuit 72.

When the CMA operation unit 63 updates the filter coefficients of the FIR filters 51 to 54, the butterfly filter 50 cancels the polarization rotation of the optical signal which occurs during transmission through the transmission line 3. The butterfly filter 50 performs a matrix operation shown in Formula (2) on the received quantized signals $eq_x$ and $eq_y$, and outputs the added signals $e_x$ and $e_y$.

$$\begin{pmatrix} e_x \\ e_y \end{pmatrix} = H \begin{pmatrix} eq_x \\ eq_y \end{pmatrix} = \begin{pmatrix} h_{xx} & h_{xy} \\ h_{yx} & h_{yy} \end{pmatrix} \begin{pmatrix} eq_x \\ eq_y \end{pmatrix} \quad (2)$$

A matrix H in Formula (2) is a matrix that is used to cancel the rotation of the polarization plane between the polarization plane of the signal light output from the transmitter and the polarization plane of the signal light input to the receiver 2. Any matrix is used as the matrix H depending on the state of the transmission line 3, and thus the matrix H cannot be determined uniquely. Therefore, in the butterfly filter 50, the elements ($h_{xx}$, $h_{xy}$, $h_{yx}$, and $h_{yy}$, which are hereinafter referred to as filter coefficients) of the matrix H are obtained using the CMA.

The CMA operation unit 63 calculates filter coefficients, and sets the calculated filter coefficients to the FIR filters 51 to 54, respectively. Assuming that filter coefficients at time k are represented by $h_{xx}(k)$, $h_{xy}(k)$, $h_{yx}(k)$, and $h_{yy}(k)$, respectively, the CMA operation unit 63 calculates filter coefficients $h_{xx}(k+1)$, $h_{xy}(k+1)$, $h_{yx}(k+1)$, and $h_{yy}(k+1)$ at time (k+1) based on the following Formula (3).

$$h_{xx}(k+1) = h_{xx}(k) + \mu \epsilon_x e_x(k) eq_x^*(k)$$

$$h_{xy}(k+1) = h_{xy}(k) + \mu \epsilon_x e_x(k) eq_y^*(k)$$

$$h_{yx}(k+1) = h_{yx}(k) + \mu \epsilon_y e_y(k) eq_x^*(k)$$

$$h_{yy}(k+1) = h_{yy}(k) + \mu \epsilon_y e_y(k) eq_y^*(k) \quad (3)$$

In Formula (3), μ represents a constant and * represents a complex conjugate. Error functions $\epsilon_x$ and $\epsilon_y$ are expressed by the following Formula (4).

$$\epsilon_x = 1 - |e_x(k)|^2$$

$$\epsilon_y = 1 - |e_y(k)|^2 \quad (4)$$

The adders 61 and 62 output signals including electric field information on two orthogonal polarization components (X-polarization and Y-polarization). However, the CMA allows the filter coefficients to converge on suitable values, thereby allowing the X-polarization ($E_x$) and the Y-polarization ($E_y$) of the DP-QPSK optical signal, which is output from the transmitter 1, to converge on the added signals $e_x$ and $e_y$. Specifically, when the signal output from the adder 61 indicates the electric field information on the X-polarization, the signal output from the adder 62 indicates the electric field information on the Y-polarization. When the signal output from the adder 61 indicates the electric field information on the Y-polarization, the signal output from the adder 62 indicates the electric field information on the X-polarization. Further, the CMA operation unit 63 controls the amplitudes of the added signals $e_x$ and $e_y$ to be constant.

The phase control circuit 71 adjusts the phase of the signal output from the adder 61, and outputs the adjusted signal to the demodulator circuit 81. The phase control circuit 72 adjusts the phase of the signal output from the adder 62, and outputs the adjusted signal to the demodulator circuit 82.

The demodulator circuit 81 demodulates the signal output from the phase control circuit 71, and outputs the demodulated signal $Ed_x$. The demodulator circuit 82 demodulates the signal output from the phase control circuit 72, and outputs the demodulated signal $Ed_y$.

As described above, the DP-QPSK optical signal whose polarization plane rotates at the angular velocity ω is demodulated by the receiver 2. However, in the butterfly filter 50 of the DSP 14 described above, only the control for holding the electric field amplitudes of the X-polarization and the Y-polarization at constant values is carried out. Accordingly, the range in which the amplitude or phase variation of the X-polarization and the amplitude or phase variation of the Y-polarization converge is uncertain.

The convergence state of the amplitude or phase variation of each of the X-polarization and the Y-polarization depends on initial filter coefficients ($h_{xx}(0)$, $h_{xy}(0)$, $h_{yx}(0)$, and $h_{yy}(0)$) of the FIR filters 51 to 54 of the butterfly filter 50. Therefore, in the DSP 14, the control circuit 15 optimizes the initial filter coefficients ($h_{xx}(0)$, $h_{xy}(0)$, $h_{yx}(0)$, and $h_{yy}(0)$) of the FIR filters 51 to 54.

Figure 4:
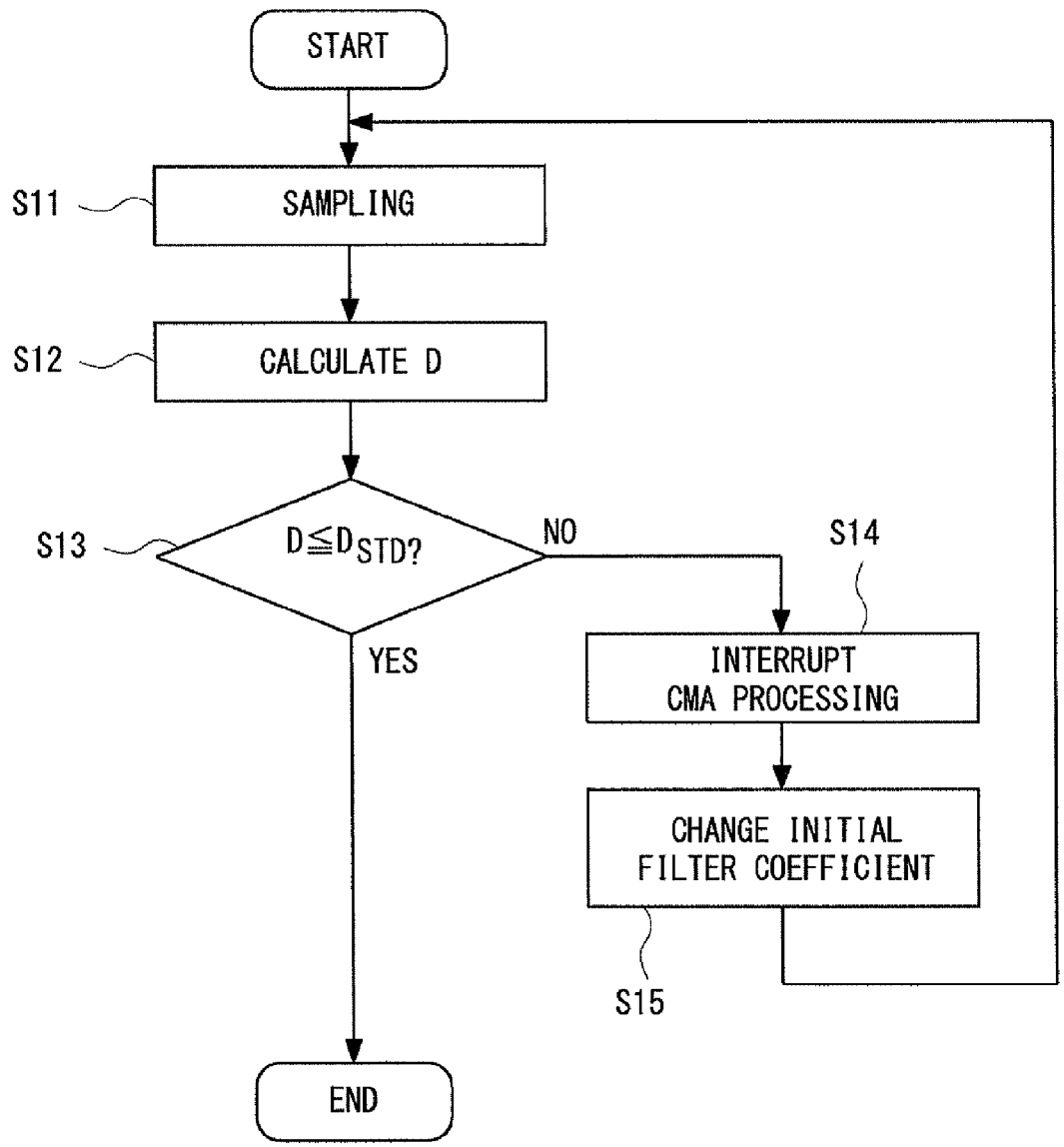
FIG. 4 is a flowchart showing a calibration operation in the receiver 2.

A calibration operation for the receiver 2 in the transmission system 100 will be described below. Prior to data transmission/reception, the transmission system 100 performs the calibration operation for the receiver 2. The control circuit 15 controls the calibration operation for the receiver 2. FIG. 4 is a flowchart showing the calibration operation in the receiver 2.

In response to the start of the calibration operation, the control circuit 15 causes the butterfly filter 50 to start CMA processing and sample the DP-QPSK signal (step S11).

The control circuit 15 calculates an amplitude or phase variation value D of each of the X-polarization and the Y-polarization according to a sampling result (step S12).

Further, the control circuit 15 compares a predetermined standard value $D_{STD}$ of the amplitude or phase variation with the amplitude or phase variation value D of each of the X-polarization and the Y-polarization (step S13).

Figure 5A:
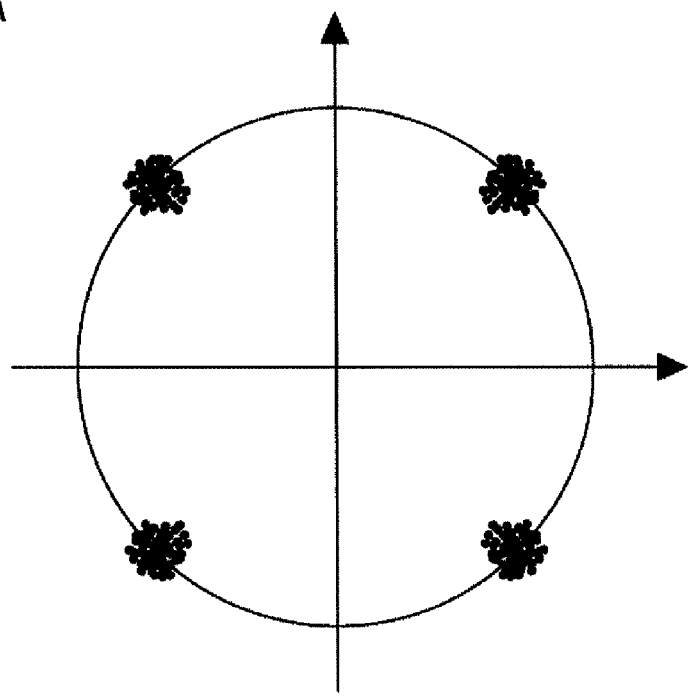
FIG. 5A is a signal space diagram showing X-polarization or Y-polarization of a DP-QPSK optical signal sampled in an excellent polarization state.
Figure 5B:
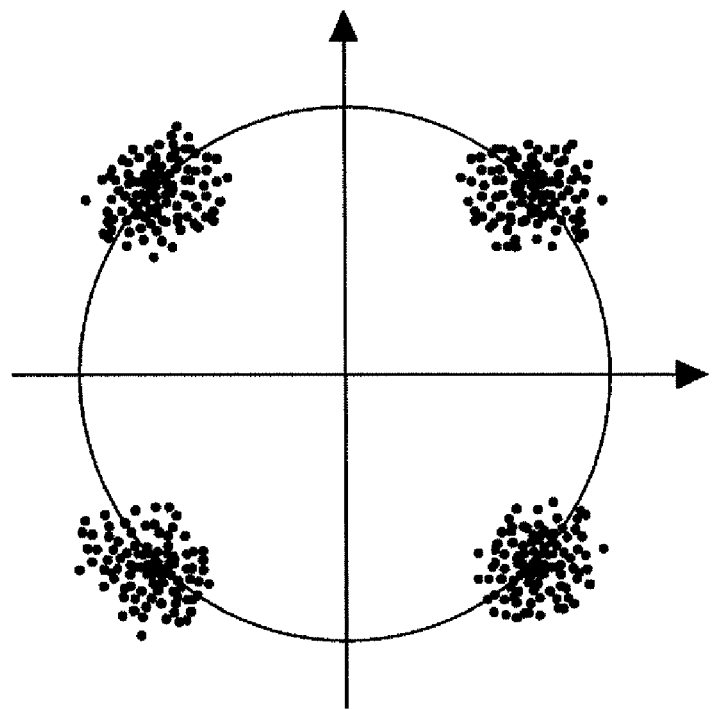
FIG. 5B is a signal space diagram showing X-polarization or Y-polarization of a DP-QPSK optical signal sampled in a poor polarization state.

Specifically, the control circuit 15 creates a signal space diagram of the DP-QPSK optical signal based on the electric signal output from the DSP 14. FIG. 5A is a signal space diagram showing the X-polarization or Y-polarization of the DP-QPSK optical signal sampled in an excellent polarization state. FIG. 5B is a signal space diagram showing the X-polarization or Y-polarization of the DP-QPSK optical signal sampled in a poor polarization state.

As shown in FIGS. 5A and 5B, spots representing the phase and amplitude of the sampled signals are distributed in the vicinity of 45°, 135°, 225°, and 315° on the circle representing a constant signal intensity. In general, when sampling can be carried out in an excellent polarization state, a variation in signal intensity (in the radial direction of the signal space diagram) and a variation in phase (in the angular direction of the signal space diagram) are small. The range in which the spots representing the phase and amplitude of the signal are distributed at each angle in FIG. 5A is smaller than that shown in FIG. 5B. Accordingly, the signal space diagram of FIG. 5A shows an excellent reception state, as compared with the signal space diagram of FIG. 5B.

The control circuit 15 determines whether the amplitude or phase variation value D of the signal, which is obtained from the signal space diagram showing the X-polarization and the Y-polarization, is equal to or less than the predetermined standard value $D_{STD}$ (step S13). When $D \leq D_{STD}$, the control circuit 15 terminates the calibration operation.

On the other hand, when $D > D_{STD}$, the control circuit 15 interrupts the CMA processing of the butterfly filter 50 (step S14). Then the control circuit 15 changes the initial filter coefficients ($h_{xx}(0)$, $h_{xy}(0)$, $h_{yx}(0)$, and $h_{yy}(0)$) of the FIR filters 51 to 54 of the butterfly filter 50 (step S15). After that, the process returns to step S11 to perform sampling again.

Specifically, the control circuit 15 repeats the cycle of steps S11 to S15 until the amplitude or phase variation D of each of the X-polarization and the Y-polarization falls within the range of the standard value $D_{STD}$. This allows the control circuit 15 to determine the initial filter coefficients ($h_{xx}(0)$, $h_{xy}(0)$, $h_{yx}(0)$, and $h_{yy}(0)$) of the FIR filters 51 to 54 of the butterfly filter 50 so that the reception characteristics of the X-polarization and the Y-polarization fall within a standard range.

The method in which the control circuit 15 determines the variation in step S13 is not limited to this, as described above. For example, both the phase variation (phase noise) and the amplitude variation (amplitude noise) may be compared with respective predetermined values. As the phase variation (phase noise), for example, a phase distribution range or a phase standard deviation on a signal space diagram can be used. As the amplitude variation (amplitude noise), for example, an amplitude distribution range or an amplitude standard deviation on a signal space diagram can be used.

As another example of the phase and amplitude variations, an area in which spots appearing on a signal space diagram are distributed can be treated as a scalar quantity, without distinguishing the phase variation and the amplitude variation from each other. In this case, the area in which the spots appearing on the signal space diagram are distributed may be compared with a predetermined value.

In the above example, the phase variation and the amplitude variation are treated as a scalar quantity, but this is by way of example only. That is, the phase variation and the amplitude variation can also be defined as a vector quantity in consideration of the directions of the variations, such as the positive and negative of values.

The above configuration allows the transmission system 100 to calibrate the reception state prior to the data transmission by the DP-QPSK optical signal. This makes it possible to suppress a variation in the communication quality of each data transmission machine and maintain a constant communication quality.

Further, in the transmission system 100, the calibration operation is performed only on the receiver 2 side. This eliminates the need to feed the information on the receiver 2 back to the transmitter 1 during the calibration operation. Therefore, the operation and effect similar to those of the transmission system 100 can be easily achieved merely by introducing the receiver 2 into an existing transmission system.

The relationship between the operation and effect of the transmission system 100 and a polarization multiplexed optical signal will now be considered. As described above, when the reception of the polarization multiplexed optical signal is started in a poor polarization state, the reception is continued in the state where the reception characteristics are poor. That is, according to the transmission system 100, the phenomenon in which when the reception of the polarization multiplexed optical signal is started in a poor polarization state, the reception is continued in the state where the reception characteristics are poor, which is a problem inherent in the communication using the polarization multiplexed optical signal, can be suitably prevented.

This exemplary embodiment illustrates the case where the CMA is used as an example of the polarization separation digital signal processing algorithm, but this is by way of example only. That is, polarization separation digital signal processing algorithms other than the CMA can also be applied. The same holds true for second and subsequent exemplary embodiments.

Second Exemplary Embodiment

Figure 6:
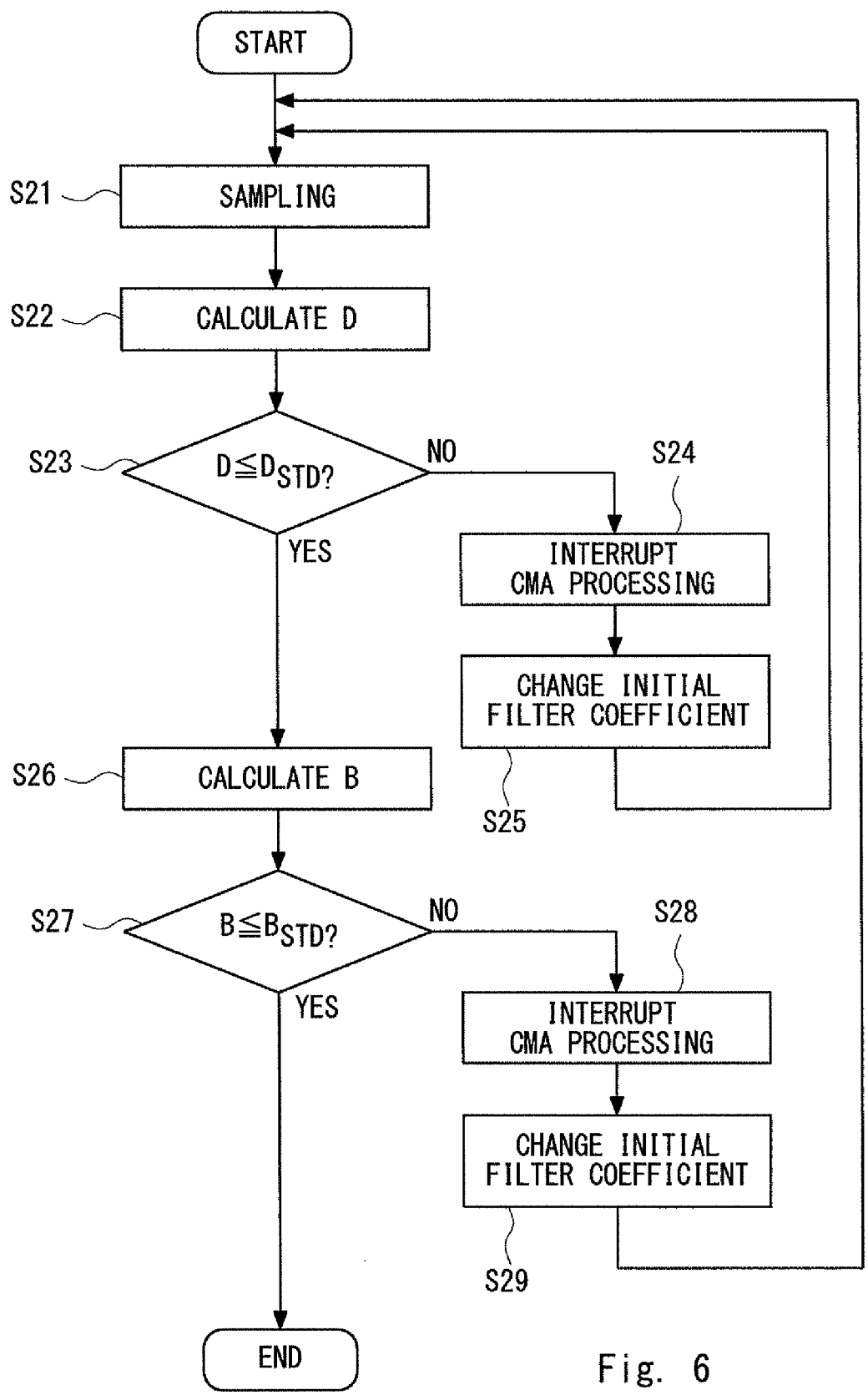
FIG. 6 is a flowchart showing a calibration operation in a transmission system 200 according to a second exemplary embodiment.

Next, a transmission system 200 according to a second exemplary embodiment of the present invention will be described. The transmission system 200 has a configuration similar to that of the transmission system 100, and thus the description of the configuration is omitted. The transmission system 200 differs from the transmission system 100 in the calibration operation performed by the control circuit 15 for the receiver 2. The calibration operation performed by the control circuit 15 will be described below. FIG. 6 is a flowchart showing the calibration operation in the transmission system 200 according to the second exemplary embodiment. Steps S21 to S25 shown in FIG. 6 are respectively similar to steps S11 to S15 shown in FIG. 4, and thus the description thereof is omitted.

Even when the amplitude or phase variation D of each of the X-polarization and the Y-polarization is equal to or less than the standard value $D_{STD}$ the reception of the X-polarization and the reception of the Y-polarization may be unbalanced. When the reception states are greatly unbalanced, the reception characteristics deteriorate to such an extent that one of the polarizations cannot be normally received. Therefore, in this exemplary embodiment, the step of determining whether the reception characteristics are unbalanced or not is added to the calibration operation of the first exemplary embodiment.

The control circuit 15 compares the signal space diagram of the X-polarization with the signal space diagram of the Y-polarization. Specifically, the control circuit 15 calculates a difference B between the amplitude or phase variation value of the X-polarization and the amplitude or phase variation value of the Y-polarization (step S26).

Further, the control circuit 15 compares the difference B between the amplitude or phase variation value of the X-polarization and the amplitude and phase variation value of the Y-polarization, with a standard value $B_{STB}$ (step S27).

FIG. 7 is a signal space diagram showing the case where the reception characteristics of the X-polarization and the Y-polarization are balanced. FIG. 8 is a signal space diagram showing the case where the reception characteristics of the X-polarization and the Y-polarization are unbalanced. It can be understood that the difference between the amplitude or phase variation of the X-polarization and the amplitude or phase variation of the Y-polarization shown in FIG. 8 is larger than that shown in FIG. 7.

When $B \leq B_{STD}$, the control circuit 15 terminates the calibration operation. On the other hand, when $B > B_{STD}$, the control circuit 15 interrupts the CMA processing of the butterfly filter 50 (step S28).

Then the control circuit 15 changes the initial filter coefficients ($h_{xx}(0)$, $h_{xy}(0)$, $h_{yx}(0)$, and $h_{yy}(0)$) of the FIR filters 51 to 54 of the butterfly filter 50 (step S29). After that, the process returns to step S21 to perform sampling again.

Therefore, the transmission system 200 can calibrate the reception state prior to the data transmission by the DP-QPSK optical signal, as in the transmission system 100. This makes it possible to suppress a variation in the communication quality of each data transmission machine and maintain a constant communication quality.

The transmission system 200 has a further advantageous effect that the balance between the reception characteristics of the X-polarization and the Y-polarization can be ensured. Consequently, the transmission system 200 can achieve higher-quality data transmission as compared with the transmission system 100.

Furthermore, in the transmission system 200, the calibration operation is performed only on the receiver 2 side as in the transmission system 100. This eliminates the need to feed the information on the receiver 2 back to the transmitter 1 during the calibration operation. Therefore, the operation and effect similar to those of the transmission system 200 can be easily achieved merely by introducing the receiver 2 into an existing transmission system.

Third Exemplary Embodiment

Next, a transmission system 300 according to a third exemplary embodiment of the present invention will be described. The transmission system 300 has a configuration similar to that of the transmission system 100, and thus the description of the configuration is omitted. The transmission system 300 is an application example of the transmission system 100, and differs from the transmission system 100 in that an operation (standard calculation operation) for determining a standard range in a calibration operation is performed prior to the calibration operation performed by the control circuit 15 for the receiver 2.

Figure 9:
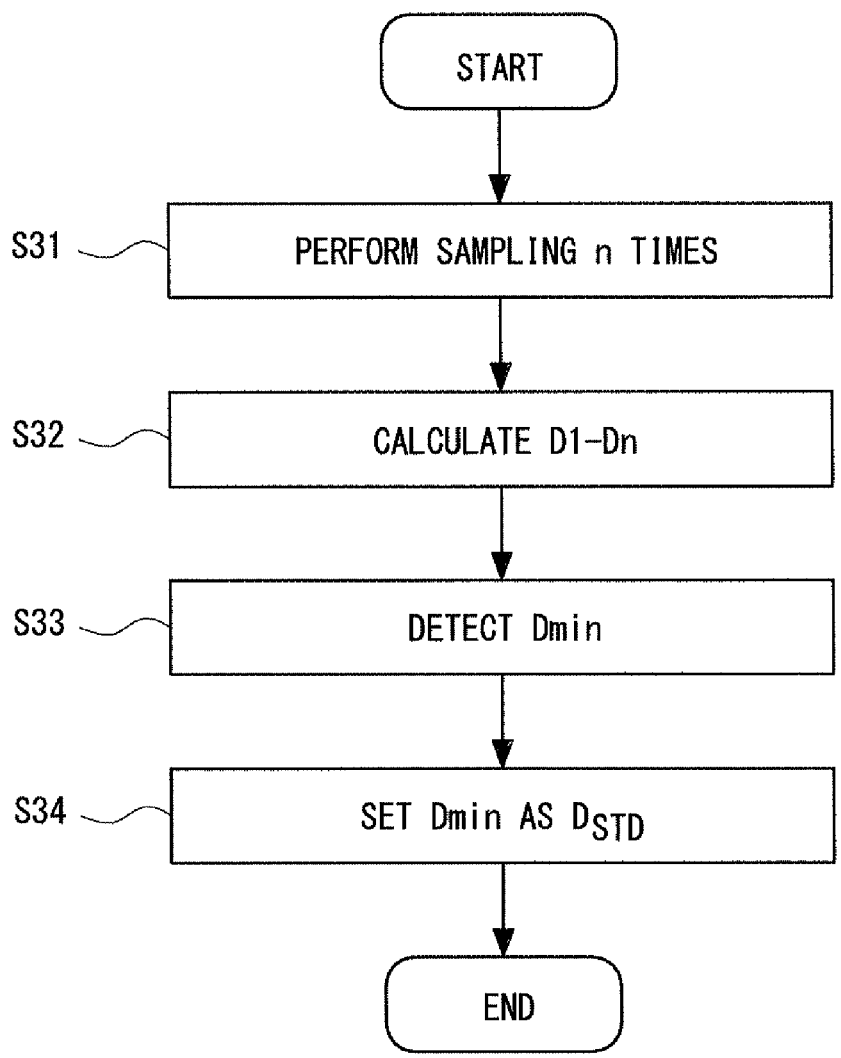
FIG. 9 is a flowchart showing a standard calculation operation in a transmission system 300 according to a third exemplary embodiment.
Figure 10:
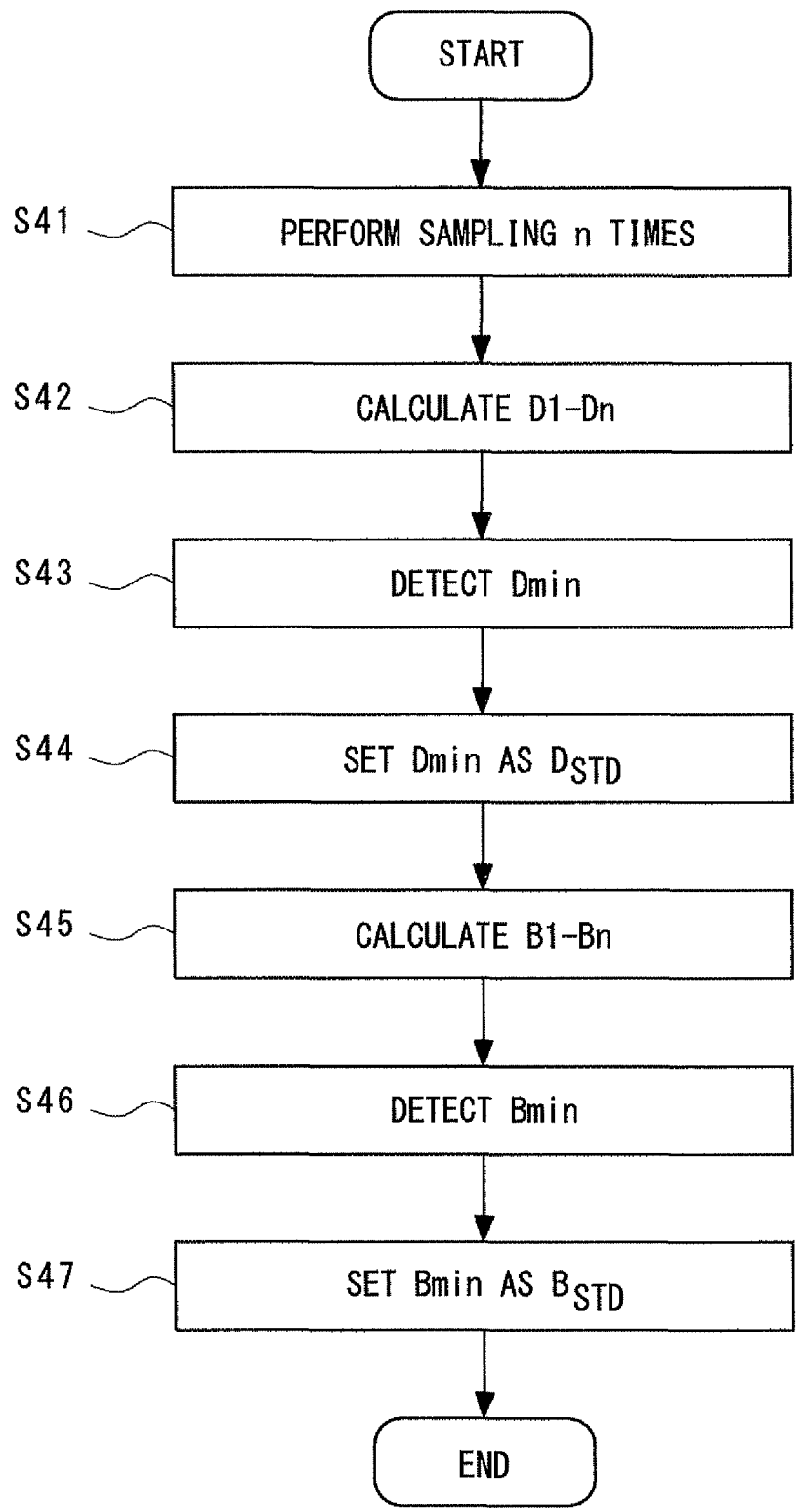
FIG. 10 is a flowchart showing a standard calculation operation in a transmission system 400 according to a fourth exemplary embodiment.

As described above in the first and second exemplary embodiments, the control circuit 15 compares the standard range with the amplitude or phase variation of each of the X-polarization and the Y-polarization (step S12 in FIG. 4 and step S22 in FIG. 6). Accordingly, it is necessary to determine the standard range in advance. This exemplary embodiment illustrates an example in which the control circuit 15 determines the standard range prior to the calibration operation. FIG. 9 is a flowchart showing the standard calculation operation in the transmission system 300 according to the third exemplary embodiment.

The control circuit 15 causes the receiver 2 to sample the DP-QPSK optical signal a predetermined number of times (in this case, n times (n is an integer equal to or greater than 2)) by using predetermined initial filter coefficients (step S31).

Further, the control circuit 15 calculates, for each of the n times of sampling, amplitude or phase variation values D1 to Dn of each of the X-polarization and the Y-polarization (step S32).

Then the control circuit 15 detects a minimum value Dmin of the calculated amplitude or phase variation values D1 to Dn of each of the X-polarization and the Y-polarization (step S33).

The detected minimum value Dmin is set as the standard value $D_{STD}$ (step S34), and the process ends.

The above configuration allows the transmission system 300 to perform sampling a plurality of times in the transmission system 300 and to set, as the standard value $D_{STD}$, the minimum value of the amplitude or phase variation values of each of the X-polarization and the Y-polarization. Thus, in the transmission system 300, the minimum value can be set as the standard value $D_{STD}$ within a feasible range. Accordingly, the calibration operation described in the first and second exemplary embodiments is performed using the standard value $D_{ST}$, which is set in this exemplary embodiment, thereby achieving an optimum reception state that can be implemented in the transmission system.

Fourth exemplary embodiment

Next, a transmission system 400 according to a fourth exemplary embodiment will be described. The transmission system 400 is a modified example of the transmission system 200. The transmission system 400 has a configuration similar to that of the transmission system 200, and thus the description of the configuration is omitted. The transmission system 400 is an application example of the transmission system 200, and differs from the transmission system 200 in that an operation (standard calculation operation) for determining a standard range in the calibration operation is performed prior to the calibration operation performed by the control circuit 15 for the receiver 2. FIG.

10 is a flowchart showing the standard calculation operation in the transmission system 400 according to the fourth exemplary embodiment.

Steps S41 to S44 are respectively similar to steps S31 to S34 shown in FIG. 9, and thus the description thereof is omitted.

After the variation standard value is set in step S44, the control circuit calculates, for each of the n times of sampling, differences B1 to Bn between the amplitude or phase variation of the X-polarization and the amplitude or phase variation of the Y-polarization (step S45).

Next, a minimum value Bmin is detected from the calculated differences B1 to Bn between the amplitude or phase variation of the X-polarization and the amplitude or phase variation in the Y-polarization (step S46).

Then the detected minimum value Bmin is set as the standard value $B_{STB}$ (step S47), and the process ends.

Therefore, according to the transmission system 400, the standard range can be set in consideration of the transmission characteristics of the transmission line 3, as in the transmission system 300. This allows the variation in reception characteristics to fall within a minimum feasible range.

Furthermore, according to the transmission system 400, a balance standard value can also be set in consideration of the transmission characteristics of the transmission line 3. This allows the balance between the X-polarization and the Y-polarization to be optimized within a feasible range.

Other Exemplary Embodiment

The present invention is not limited to the above-described exemplary embodiments, and can be modified as appropriate without departing from the scope of the invention. For example, in the third exemplary embodiment, the minimum value is detected from the calculated n variation values in step S33, but this is by way of example only. Accordingly, for example, the average value of the calculated n variation values may be calculated. In other words, the average value of the calculated n variation values may be set as the standard value.

While the third exemplary embodiment illustrates an example in which the standard value of the amplitude or phase variation is calculated, a standard value of the difference between the amplitude or phase variation of the X-polarization and the amplitude or phase variation of the Y-polarization may also be set at the same time.

FIG. 1 illustrates a configuration in which the transmitter and the polarization scrambler are independent of each other, but this configuration is by way of example only. That is, a polarization scrambling function may be incorporated in the transmitter.

While the above exemplary embodiments illustrate the operation of the control circuit 15, a hardware resource, such as a computer, can be used as the control circuit 15. Specifically, an operation performed by the control circuit 15, i.e., an operation equivalent to the operation shown in FIGS. 4, 6, and 9, can be implemented by causing a computer to execute a program.

The above exemplary embodiments illustrate the QPSK as an example of a multilevel optical modulation system, but this is by way of example only. Accordingly, multilevel optical modulation systems other than the QPSK can also be applied.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

The present invention has been described above with reference to exemplary embodiments, but the present invention is not limited to the above exemplary embodiments. The configuration and details of the present invention can be modified in various manners which can be understood by those skilled in the art within the scope of the invention.

This application is based upon and claims the benefit of priority from Japanese patent application No. 2012-046560, filed on Mar. 2, 2012, the disclosure of which is incorporated herein in its entirety by reference.

REFERENCE SIGNS LIST

1 TRANSMITTER
2 RECEIVER
3 TRANSMISSION LINE
4 OPTICAL AMPLIFIER
5 POLARIZATION SCRAMBLER
10 RECEPTION FRONT END
11, 13 PBS
12 LOCAL OSCILLATOR LIGHT SOURCE
14 DSP
15 CONTROL CIRCUIT
21, 22 90° HYBRID
31-34 OPTICAL/ELECTRICAL CONVERTER
50 BUTTERFLY FILTER
51-54 FIR FILTER
61, 62 ADDER
63 CMA OPERATION UNIT
71, 72 PHASE CONTROL CIRCUIT
81, 82 DEMODULATOR CIRCUIT
100, 200, 300, 400 TRANSMISSION SYSTEM
$eq_x$, $eq_y$ QUANTIZED SIGNAL
$e_x$, $e_y$ ADDED SIGNAL
$Ed_x$, $Ed_y$ DEMODULATED SIGNAL

The invention claimed is:

1. A receiver comprising:
a reception front end that receives a polarization-scrambled polarization multiplexed optical signal, polarization-separates the received polarization multiplexed optical signal into first and second polarization components, and photoelectrically converts the first and second polarization components into first and second digital signals, respectively;
a digital signal processor that samples the first and second digital signals, demodulates the first and second digital signals by using a polarization separation digital signal processing algorithm, and outputs first and second demodulated signals; and
a control circuit that, when phase variations of the first and second demodulated signals or amplitude variations of the first and second demodulated signals are greater than a first predetermined value, causes the digital signal processor to interrupt processing using the polarization separation digital signal processing algorithm, changes an initial value of a filter coefficient used for the polarization separation digital signal processing algorithm, and then causes the digital signal processor to start the processing using the polarization separation digital signal processing algorithm.

2. The receiver according to claim 1, wherein the polarization separation digital signal processing algorithm is a CMA algorithm.

3. The receiver according to claim 1, wherein
the digital signal processor includes a butterfly filter that receives the first and second digital signals, and
the butterfly filter includes:
first and second adders;
a first FIR filter that outputs, to the first adder, a signal obtained by filtering the first digital signal;
a second FIR filter that outputs, to the first adder, a signal obtained by filtering the second digital signal;
a third FIR filter that outputs, to the second adder, a signal obtained by filtering the first digital signal;
a fourth FIR filter that outputs, to the second adder, a signal obtained by filtering the second digital signal; and
a polarization separation digital signal processing algorithm operation unit that monitors the first and second adders, and updates filter coefficients of the first to fourth FIR filters according to a monitoring result.

4. The receiver according to claim 1, wherein
the polarization multiplexed optical signal is polarization-multiplexed by a transmitter, and is polarization-scrambled by a polarization scrambler, and
the polarization-scrambled polarization multiplexed optical signal is input to the receiver through a transmission line.

5. The receiver according to claim 1,
wherein When a difference between the phase variation of the first demodulated signal and the phase variation of the second demodulated signal or a difference between the amplitude variation of the demodulated signal and the amplitude variation of the second demodulated signal is greater than a second predetermined value, the control circuit causes the digital signal processor to interrupt the processing using the polarization separation digital signal processing algorithm, changes initial value of the filter coefficient used for the polarization separation digital signal processing algorithm, and then causes the digital signal processor to start the processing using the polarization separation digital signal processing algorithm.

6. The receiver according to claim 5, wherein
during an initial calculation step, the control circuit causes the digital signal processor to sample the first and second digital signals a plurality of times, calculates, for each sampling, phase variations of the first and second demodulated signals or amplitude variations of the first and second demodulated signals, and sets a minimum value of the calculated variations as the first predetermined value.

7. The receiver according to claim 6, Wherein,
during the initial calculation step, the control circuit calculates, for each sampling, a difference between the phase variation of the first demodulated signal and the phase variation of the second demodulated signal or a difference between the amplitude variation of the first demodulated signal and the amplitude variation of the second demodulated signal, and sets a minimum value of the calculated difference as the second predetermined value.

8. A transmission system comprising:
a transmitter that outputs a polarization multiplexed optical signal;
a polarization scrambler that polarization-scrambles the polarization multiplexed optical signal;
a transmission line through which the polarization-scrambled polarization multiplexed optical signal is propagated; and
a receiver that receives the polarization-scrambled polarization multiplexed optical signal through the transmission line,
wherein the receiver includes:
a reception front end that polarization-separates the received polarization multiplexed optical signal into first and second polarization components, and photoelectrically converts the first and second polarization components into first and second digital signals, respectively;
a digital signal processor that samples the first and second digital signals, demodulates the first and second digital signals by using a polarization separation digital signal processing algorithm, and outputs first and second demodulated signals; and
a control circuit that, when phase variations of the first and second demodulated signals or amplitude variations of the first and second demodulated signals are greater than a first predetermined value, causes the digital signal processor to interrupt processing using the polarization separation digital signal processing algorithm, changes an initial value of a filter coefficient used for the polarization separation digital signal processing algorithm, and then causes the digital signal processor to start the processing using the polarization separation digital signal processing algorithm.

9. The transmission system according to claim 8, wherein the polarization separation digital signal processing algorithm is a CMA algorithm.

10. The transmission system according to claim 8, wherein
the digital signal processor includes a butterfly filter that receives the first and second digital signals, and
the butterfly filter includes:
first and second adders;
a first FIR filter that outputs, to the first adder, a signal obtained by filtering the first digital signal;
a second FIR filter that outputs, to the first adder, a signal obtained by filtering the second digital signal;
a third FIR filter that outputs, to the second adder, a signal obtained by filtering the first digital signal;
a fourth FIR filter that outputs, to the second adder, a signal obtained by filtering the second digital signal; and
a polarization separation digital signal processing algorithm operation unit that monitors the first and second adders, and updates filter coefficients of the first to fourth FIR filters according to a monitoring result.

11. The transmission system according to claim 8, wherein
when a difference between the phase variation of the first demodulated signal and the phase variation of the second demodulated signal or a difference between the amplitude variation of the first demodulated signal and the amplitude variation of the second demodulated signal is greater than a second predetermined value, the control circuit causes the digital signal processor to interrupt the processing using the polarization separation digital signal processing algorithm, changes the value of the filter coefficient used for the polarization separation digital signal processing algorithm, and then causes the digital signal processor to start the processing using the polarization separation digital signal processing algorithm.

12. The transmission system according to claim 11, wherein
during an initial calculation step, the control circuit causes the digital signal processor to sample the first and second digital signals a plurality of times, calculates, for each sampling, phase variations of the first and second demodulated signals or amplitude variations of the first and second demodulated signals, and sets a minimum value of the calculated variations as the first predetermined value.

13. The transmission system according to claim 12, wherein
during the initial calculation step, the control circuit calculates, for each sampling, a difference between the phase variation of the first demodulated signal and the phase variation of the second demodulated signal or a difference between the amplitude variation of the first demodulated signal and the amplitude variation of the second demodulated signal, and sets a minimum value of the calculated difference as the second predetermined value.

14. A method for receiving a polarization multiplexed optical signal, comprising:
polarization-separating a polarization-scrambled polarization multiplexed optical signal into first and second polarization components;
photoelectrically converting the first and second polarization components into first and second digital signals, respectively;
sampling the first and second digital signals and demodulating the first and second digital signals by using a polarization separation digital signal processing algorithm;
outputting the demodulated signals as first and second demodulated signals, respectively;
causing a digital signal processor to interrupt processing using the polarization separation digital signal processing algorithm when phase variations of the first and second demodulated signals or amplitude variations of the first and second demodulated signals are greater than a first predetermined value; and
changing an initial value of a filter coefficient used for the polarization separation digital signal processing algorithm, and then starting the processing using the polarization separation digital signal processing algorithm.

15. The method for receiving a polarization multiplexed optical signal according to claim 14, wherein the polarization separation digital signal processing algorithm is a CMA algorithm.

16. The method for receiving a polarization multiplexed optical signal according to claim 14, wherein
the first and second digital signals are input to a butterfly filter, and
the butterfly filter includes:
first and second adders;
a first FIR filter that outputs, to the first adder, a signal obtained by filtering the first digital signal;
a second FIR filter that outputs, to the first adder, a signal obtained by filtering the second digital signal;
a third FIR filter that outputs, to the second adder, a signal obtained by filtering the first digital signal;
a fourth FIR filter that outputs, to the second adder, a signal obtained by filtering the second digital signal; and
a polarization separation digital signal processing algorithm operation unit that monitors the first and second adders, and updates filter coefficients of the first to fourth FIR filters according to a monitoring result.

17. The method for receiving a polarization multiplexed optical signal according to claim 14, wherein
the polarization multiplexed optical signal is polarization-multiplexed by a transmitter, and is polarization-scrambled by a polarization scrambler, and
the polarization-scrambled polarization multiplexed optical signal is input to a receiver through a transmission line.

18. The method for receiving a polarization multiplexed optical signal according to claim 14, further comprising:
interrupting the processing using the polarization separation digital signal processing algorithm when a difference between the phase variation of the first demodulated signal and the phase variation of the second demodulated signal or a difference between the amplitude variation of the first demodulated signal and the amplitude variation of the second demodulated signal is greater than a second predetermined value;
changing the value of the filter coefficient used for the polarization separation digital signal processing algorithm; and
starting the processing using the polarization separation digital signal processing algorithm.

19. The method for receiving a polarization multiplexed optical signal according to claim 18, further comprising:
during an initial calculation step, sampling the first and second digital signals a plurality of times,
calculating phase variations of the first and second demodulated signals or amplitude variations of the first and second demodulated signals for each sampling, and
setting a minimum value of the calculated variations as the first predetermined value.

20. The method for receiving a polarization multiplexed optical signal according to claim 19, wherein
during the initial calculation step,
calculating a difference between the phase variation of the first demodulated signal and the phase variation of the second demodulated signal or a difference between the amplitude variation of the first demodulated signal and the amplitude variation of the second demodulated signal for each sampling, and
setting a minimum value of the calculated difference as the second predetermined value.

21. A non-transitory computer readable medium storing a control program for a receiver, wherein:
the receiver comprises:
a reception front end that receives a polarization-scrambled polarization multiplexed optical signal, polarization-separates the received polarization multiplexed optical signal into first and second polarization components, and photoelectrically converts the first and second polarization components into first and second digital signals, respectively; and
a digital signal processor that samples the first and second digital signals, demodulates the first and second digital signals by using a polarization separation digital signal processing algorithm, and outputs first and second demodulated signals; and
the control program, when executed by a computer, causes the computer to perform a method comprising:

causing the digital signal processor to interrupt processing using the polarization separation digital signal processing algorithm when phase variations of the first and second demodulated signals or amplitude variations of the first and second demodulated signals are greater than a first predetermined value; and changing an initial value of a filter coefficient used for the polarization separation digital signal processing algorithm, and then causing the digital signal processor to start the processing using the polarization separation digital signal processing algorithm.

22. The non-transitory computer readable medium storing a control program for a receiver according to claim 21, wherein the polarization separation digital signal processing algorithm is a CMA algorithm.

23. The non-transitory computer readable medium storing a control program for a receiver according to claim 21, wherein
the digital signal processor includes a butterfly filter that receives the first and second digital signals, and
the butterfly filter includes:
first and second adders;
a first FIR filter that outputs, to the first adder, a signal obtained by filtering the first digital signal;
a second FIR filter that outputs, to the first adder, a signal obtained by filtering the second digital signal;
a third FIR filter that outputs, to the second adder, a signal obtained by filtering the first digital signal;
a fourth FIR filter that outputs, to the second adder, a signal obtained by filtering the second digital signal; and
a polarization separation digital signal processing algorithm operation unit that monitors the first and second adders, and updates filter coefficients of the first to fourth FIR filters according to a monitoring result.

24. The non-transitory computer readable medium storing a control program for a receiver according to claim 21, wherein
the polarization multiplexed optical signal is polarization-multiplexed by a transmitter, and is polarization-scrambled by a polarization scrambler, and
the polarization-scrambled polarization multiplexed optical signal is input to the receiver through a transmission line.

25. The non-transitory computer readable medium storing a control program for a receiver according to claim 21, wherein the method further comprises:
interrupting the processing using the polarization separation digital signal processing algorithm when a difference between the phase variation of the first demodulated signal and the phase variation of the second demodulated signal or a difference between the amplitude variation of the first demodulated signal and the amplitude variation of the second demodulated signal is greater than a second predetermined value;
changing the value of the filter coefficient used for the polarization separation digital signal processing algorithm; and
starting the processing using the polarization separation digital signal processing algorithm.

26. The non-transitory computer readable medium storing a control program for a receiver according to claim 25, wherein the method further comprises:
during an initial calculation step, sampling the first and second digital signals a plurality of times;
calculating, for each sampling, phase variations of the first and second demodulated signals or amplitude variations of the first and second demodulated signals; and
setting a minimum value of the calculated variations as the first predetermined value.

27. The non-transitory computer readable medium storing a control program for a receiver according to claim 26, wherein the method further comprises:
during the initial calculation step, calculating, for each sampling, a difference between the phase variation of the first demodulated signal and the phase variation of the second demodulated signal or a difference between the amplitude variation of the first demodulated signal and the amplitude variation of the second demodulated signal; and
setting a minimum value of the calculated difference as the second predetermined value.

* * * * *

UNITED STATES PATENT AND TRADEMARK OFFICE
CERTIFICATE OF CORRECTION

PATENT NO. : 9,515,743 B2  
APPLICATION NO. : 14/382494  
DATED : December 6, 2016  
INVENTOR(S) : Suzuki Page 1 of 1

It is certified that error appears in the above-identified patent and that said Letters Patent is hereby corrected as shown below:

In the Claims

Claim 5, Column 15, Line 35:
"wherein When a difference" should read --wherein when a difference--.

Claim 5, Column 15, Line 38:
"the demodulated signal" should read --the first demodulated signal--.

Claim 5, Column 15, Lines 43-44:
"changes initial value" should read --changes the value--.

Claim 7, Column 15, Lines 58-59:
"claim 6, Wherein, during" should read --claim 6, wherein during--.

Claim 7, Column 15, Line 59:
"step,the control circuit" should read --step, the control circuit--.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*